United States Patent [19]

Harris

[11] 4,072,614
[45] Feb. 7, 1978

[54] OIL AND WATER SEPARATORS

[76] Inventor: Frank N. Harris, 4761 SW. Martha St., Portland, Oreg. 97221

[21] Appl. No.: 658,468

[22] Filed: Feb. 17, 1976

Related U.S. Application Data

[63] Continuation of Ser. No. 551,543, Feb. 21, 1975, abandoned, which is a continuation-in-part of Ser. No. 516,193, Oct. 21, 1974, abandoned.

[51] Int. Cl.² .......................................... B01D 21/02
[52] U.S. Cl. ................................. 210/305; 210/307; 210/521
[58] Field of Search .............. 210/97, 104, 260, 262, 210/83, 521, 522, 537, 538, 540, 249–251, DIG. 5, 305, 307

[56] References Cited

U.S. PATENT DOCUMENTS

| | | | |
|---|---|---|---|
| 1,156,276 | 10/1915 | Darrow | 210/522 |
| 1,345,090 | 6/1920 | Keller | 210/521 X |
| 1,661,284 | 3/1928 | Fuqua et al. | 210/DIG. 5 |
| 1,709,971 | 4/1929 | Coe | 210/521 |
| 1,784,943 | 12/1930 | Muller | 210/522 |
| 2,729,335 | 1/1956 | Estrada | 210/522 |
| 2,793,186 | 5/1957 | Dunnell et al. | 210/521 |
| 2,917,178 | 12/1959 | Unthank et al. | 210/521 X |
| 3,052,359 | 9/1962 | Rounds | 210/521 X |
| 3,195,295 | 7/1965 | Muller | 210/DIG. 5 |
| 3,666,108 | 5/1972 | Veld | 210/522 X |

FOREIGN PATENT DOCUMENTS

| | | | |
|---|---|---|---|
| 96,580 | 1/1961 | Netherlands | 210/DIG. 21 |
| 858,127 | 1/1961 | United Kingdom | 210/DIG. 5 |

*Primary Examiner*—Frank W. Lutter
*Assistant Examiner*—Richard L. Chiesa
*Attorney, Agent, or Firm*—Klarquist, Sparkman, Campbell, Leigh, Hall & Whinston

[57] ABSTRACT

Oily water is introduced into the lower ends of outer vessels and flows upwardly in annular spaces between the outer vessels and inner separating vessels and into the inner vessels below inwardly spaced, shallowly cupped, annular separating discs. Larger particles of oil flow past the discs directly to the tops of caps on the outer vessels. The smaller particles of oil coalesce on and flow slowly along the bottoms of the discs to central openings in the discs, and up into the caps. The oil flows out of the caps when valves are opened by ultrasonic sensing probes actuated by accumulation of predetermined quantities of oil in the caps. The water flows out of outlets positioned near the bottoms of the inner vessels. In an alternate embodiment, a filter member of foam plastic is inclined to the flow toward the water outlet and coalesces any oil yet remaining in the water.

16 Claims, 7 Drawing Figures

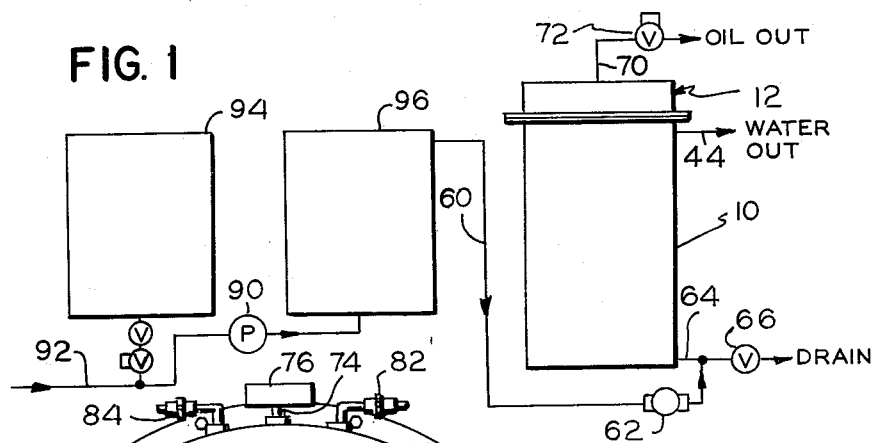
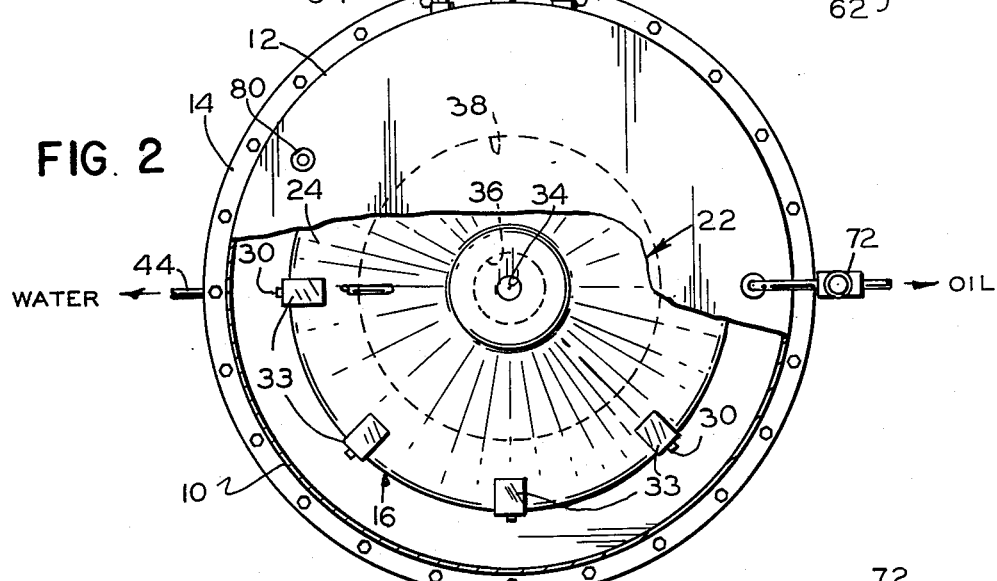
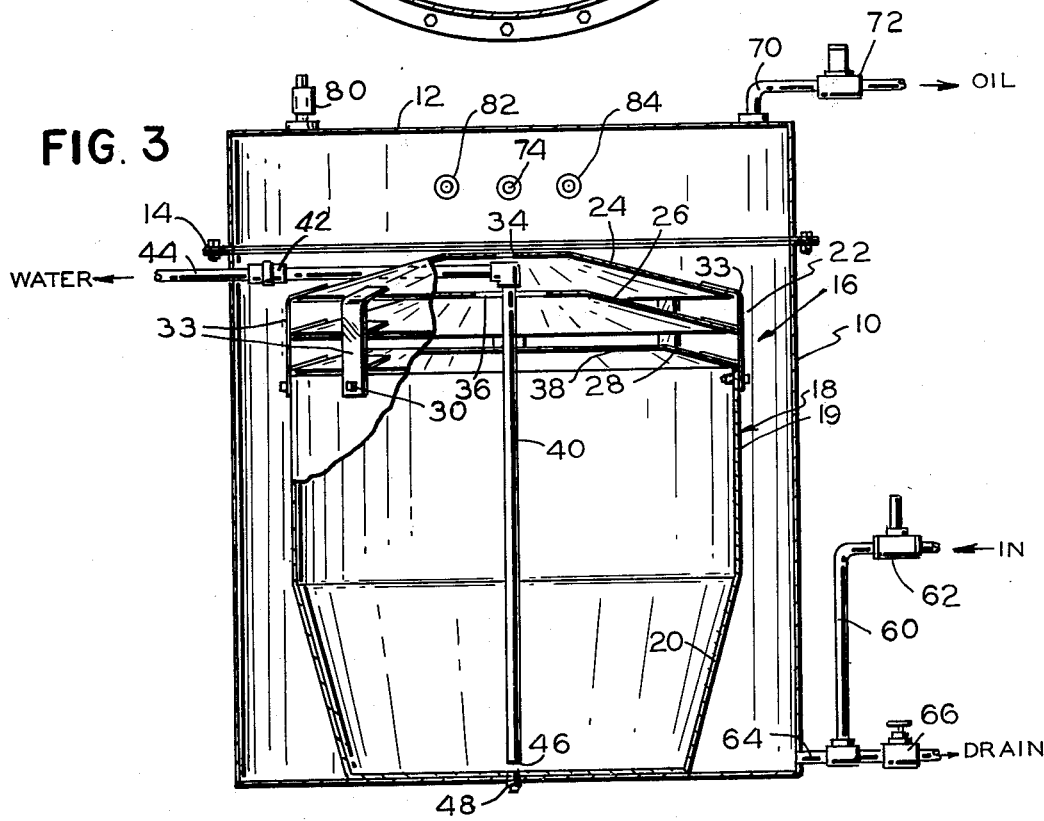

OIL AND WATER SEPARATORS

DESCRIPTION

This is a continuation of now abandoned application Ser. No. 551,543, filed Feb. 21, 1975, which, in turn, is a continuation-in-part of abandoned application Ser. No. 516,193, filed Oct. 21, 1974.

This invention relates to improved oil and water separators, and has for an object thereof the provision of improved oil and water separators.

Another object of the invention is to provide very effective oil and water separators which may be easily disassembled for cleaning.

A further object of the invention is to provide an oil and water separator including a plurality of shallowly dished discs under which oil and water to be separated are flowed.

Another object of the invention is to provide oil and water separators in which inner vessels are mounted in outer vessels and have a series of annular discs having progressively smaller central openings proceeding upwardly and outer openings therebetween receiving oil-water mixtures introduced into the spaces between the vessels.

Another object of the invention is to provide an oil and water separator including an inner chamber having a sloping filter therein.

In the drawings:

FIG. 1 is a schematic view of a system including an oil and water separator forming one embodiment of the invention;

FIG. 2 is an enlarged partially sectional, top plan view of the separator of FIG. 1;

FIG. 3 is an enlarged vertical sectional view of the separator of FIG. 1;

Figure 4:
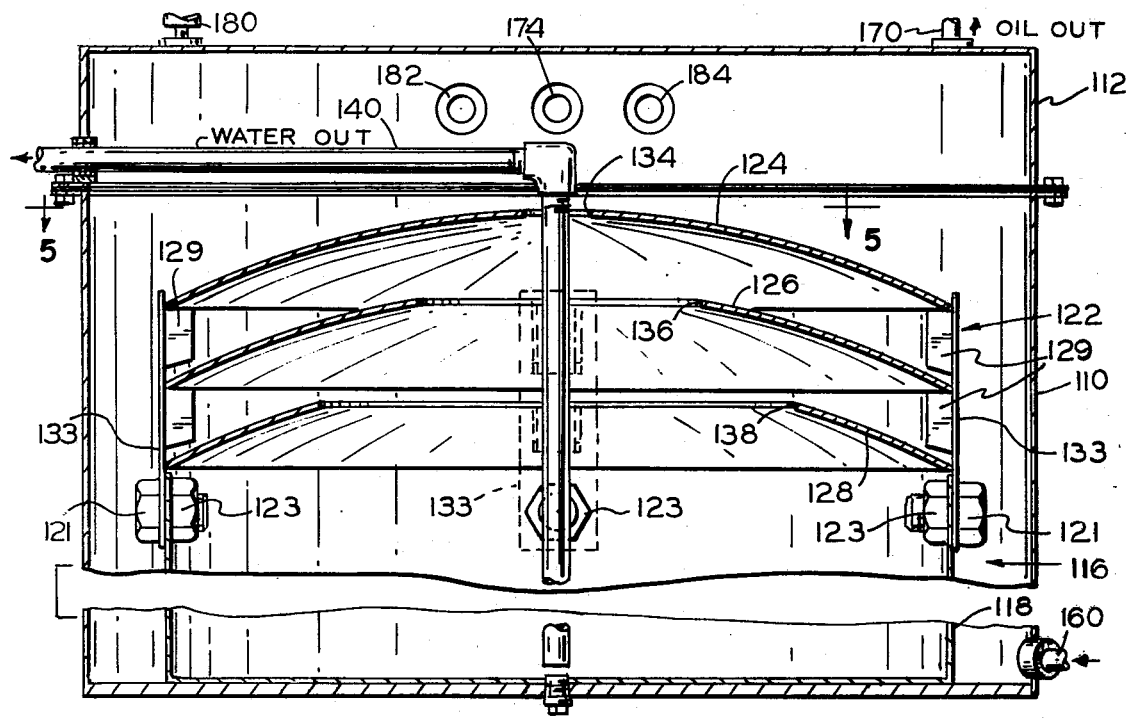
FIG. 4 is a fragmentary, vertical sectional view of an oil and water separator forming an alternate embodiment of the invention.

Referring now in detail to the drawings, there is shown in FIGS. 1-3 an oil and water separator forming one embodiment of the invention and including a flanged, cup-like outer cylinder 10, a flanged, cupped cover 12 bolted to the cylinder 10 with a gasket 14 therebetween, and an inner separating vessel 16. The vessel 16 includes a cup 18 having a cylindrical upper section 19 and a frustoconical, cupped, lower section 20 welded or otherwise fixed to the bottom of the outer cylinder 10, and also includes a removable separator disc assembly 22 including annular separating baffles or discs 24, 26 and 28 detachably secured to the cup 18 by bolts 30 bolting upright spacers or bars 33 to the vessel 16. The separating discs are welded to radially inwardly extending ears or tabs of the spacers. The assembly 22 may be removed for cleaning the cup 18.

The discs 24, 26 and 28 are shallow and bowl-like in their configurations, and the three discs 24, 26 and 28 have central, top, circular openings 34, 36 and 38, respectively, of progressively decreasing diameters, proceeding upwardly. The slope of the frustoconical portions of the discs is preferably about 15°. An L-shaped water drain pipe 40 passes through the disc 24, and is connected by a union 42 to an external water drain pipe 44. For industrial applications, the pipe 44 is unobstructed and is under atmospheric pressure. For use of the separator on a ship, to prevent spillage from rolling of the ship, a relief valve (not shown) is placed in the pipe 44 to permit flow of water therethrough at a pressure slightly higher than atmospheric pressure, flow being permitted, for example, only at water pressures greater than five pounds per square inch. Entrance end 46 of the pipe 40 is positioned quite close to the bottom of the cup 18 and is centered in the cup. A threaded plug 48 is screwed into holes in the bottoms of the cylinder 10 and the cup 18 to permit draining during cleaning of the separator.

An inlet supply pipe 60 having a check valve 62 therein is connected to an inlet 64 near the bottom of the cylinder 10. The inlet 64 is directed radially into the cylinder 10. A drain valve 66 is connected to the inlet supply pipe 60 for draining the cylinder when desired. An oil-water mixture under some pressure, for example, slightly under 15 pounds per square inch, is supplied continuously to the cylinder 10 through the pipe 60 and moves into a large volume, turbulence preventing portion of the cylinder at the lower end portion of the cupped lower section 20. The frustoconical shape of the lower section 20 gives a large volume or space to the entrance portion so that turbulence from the pipe 60 is minimized. The oil-water mixture flows up through the annular space between the cup 18 and the cylinder 10, and flows under the discs 24 and 26 and into the vessel 16. The water flows continuously downwardly to the drain pipe 40 and flows continuously out of the pipe 40.

The annular space between the cylindrical portion of the cup 18 and cylinder 10 preferably has a substantially smaller transverse cross-sectional area than the transverse cross-sectional area of the cylindrical portion of the cup so that the velocity of the flow downwardly through the cup is substantially less than that of the upward flow through this annular space. The higher velocity of the incoming mixture along this somewhat constricted annular space causes the larger globules or droplets of oil to travel directly up into the cover 12. Most of the water and the finer particles of oil flow under the discs 24 and 26. The lower velocity of the water travelling downwardly in the cup 18 insures the separation and rise of the finer particles of oil. The finer particles of oil, being lighter than the water, coalesce in larger drops on the undersides of the discs 24, 26 and 28, and these drops flow slowly upwardly and radially inwardly to the openings 34, 36 and 38. These drops of oil float upwardly through the openings 34, 36 and 38 to the upper part of the cover 12 and out through an oil drain 70 to a collecting chamber (not shown). A valve 72 is opened whenever oil collects down to the level of a known ultrasonic interface sensing probe 74 mounted in one side of the cover 12 and connected to a known ultrasonic control unit (not shown) which opens the valve 72, and the valve is kept open until the oil and water interface is moved up above the probe. A pressure relief valve 80 set to open when the pressure is excessive, for example, greater than 16 pounds per square inch, is mounted in the top of the cover to relieve greatly excessive pressure. Pipe couplings 82 and 84 provided in the side of the cover, are shown with plugs therein. For cold weather operation, the plugs may be removed and a heating coil connected to the couplings, hot water being supplied to the coil. A "Y" strainer (not shown) may be placed in the T portion of the pipe 60 and drain valve 66.

In a separator forming one specific example of the invention, a pump 90 (FIG. 1) continuously pumped the oil-water mixture and an emulsifying chemical from a line 92 and a chemical supply and feeder tank 94 through an emulsion breaker 96 to the supply pipe 60. The mixture had a pressure of slightly less than 15 pounds per square inch as it flowed into the large-volume lower portion of the annular chamber in the cylinder 10. The flow of the mixture was about two gallons per minute and, to provide a rapid upward flow and a slow downward flow, the cross-sectional area of the cylindrical portion of the cup 18 was about thirty percent larger than the transverse cross-sectional area of the annular passage between the cylindrical portion of the cup 18 and the outer cylinder 10, the diameter of the cylinder being sixteen inches and that of the cylindrical portion of the cup being twelve inches. For separators several times larger than the specific example just described, it is desirable to have the transverse cross-sectional area of the cylindrical portion of the cup 18 be from three to four times the transverse cross-sectional area of the annular passage between the cup and the outer cylinder.

EMBODIMENT OF FIGS. 4 AND 5

Figure 5:
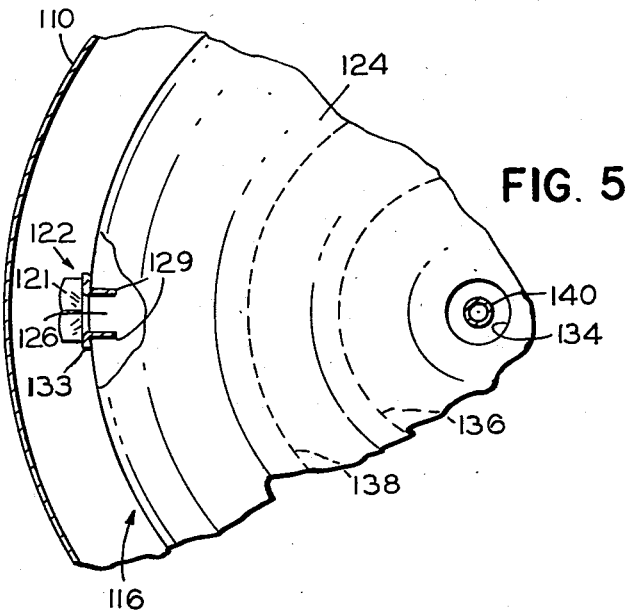
FIG. 5 is a fragmentary, horizontal sectional view taken along line 5—5 of FIG. 4.

An oil and water separator forming an alternate embodiment of the invention, shown in FIGS. 4 and 5, and generally like the separator shown in FIGS. 1-3, includes a flanged, cup-like outer cylinder 110 and an inner separating vessel 116 having a cup 118 fixed thereto in a centered portion relative thereto. A flanged, cupped cover 112 is bolted to the flanged top of the cylinder 110. The cup 118 is cylindrical throughout its length, and a removable separator disc assembly 122 is secured to the cup 118 by bolts 121 and nuts 123 welded to the vessel 116. The assembly 122 includes discs 124, 126 and 128 welded to radially inwardly extending pairs of ears 129 of upright spacers or bars 133. The discs 124, 126 and 128 are shallowly dished.

A water drain pipe 140 is secured to and supported by the cover 112 and extends loosely through holes 134, 136 and 138 in the discs 124, 126 and 128, and is removable with the cover 112. The outer end of the pipe is connected by a union (not shown) to a drain pipe and water is continuously drained therefrom. To avoid turbulence from the oil-water mixture entering the separator, a plurality of inlet supply pipes 160 are directed tangentially or slightly chordally into the lower portion of the cylinder 110 and are spaced substantially equiangularly around the cylinder 110, three of the pipes 160 being included in the specific embodiment disclosed herein. The tangential directions of all of the pipes are the same. That is, they are all directed in the same circular direction, clockwise or counter-clockwise, depending on the viewing thereof. An oil drain 170, an interface sensing probe 174 and a pipe 180 to a pressure relief valve (not shown) also are provided. Pipe couplings 182 and 184 are provided for a heating coil (not shown) for cold weather operation.

EMBODIMENT OF FIGS. 6 AND 7

An oil and water separator forming an alternate embodiment of the invention is generally similar to the separator of FIGS. 1-3 and includes a flanged, cup-like outer cylinder 210, a cover 212 sealed to the cylinder 210, and a cupped, inner, cylindrical separating vessel 216 including a cup 218 fixed to the bottom of the outer cylinder 210. A removable separator disc assembly 222 including annular separating baffles or discs 224, 226 and 228 is detachably secured to the cup 218 by bolts 30 bolting upright spacers or bars 33 to the cup 218.

An L-shaped water drain pipe 240 passes through the discs, and is connected by a union 242 to an external water drain pipe 244. The pipe 244 is connected to a relief valve 245 to permit outlet flow of water through the pipe only at a pressure slightly higher than atmospheric pressure, flow being permitted, for example, only at water pressures greater than 5 pounds per square inch. Entrance end 246 of the pipe 240 is positioned quite close to the bottom of the cup 218 and is centered in the cup. A threaded plug 248 is screwed into holes in the bottoms of the cylinder 210 and the cup 218 to permit draining during cleaning of the separator. Like the separator of FIGS. 1-3, an inlet supply pipe 260 having a check valve 262 therein is connected to an inlet 264 near the bottom of the cylinder 210. The inlet 264 is directed radially into the cylinder 210, a drain valve 266 also being provided for draining the cylinder when desired.

An oil-water mixture under some pressure, for example, slightly under 15 pounds per square inch, is supplied continuously to the cylinder 210 through the pipe 260 and moves into a large area, turbulence preventing portion of the cylinder 210 at the lower end portion thereof. The oil-water mixture flows up through the annular space between the cup 218 and the cylinder 210, and flows under the discs 224 and 226 and into the cup 218. The water flows continuously downwardly to the drain pipe 240 through a removable, inclined, elliptical filter 243 and flows continuously out of the pipe 240.

The filter 243 slopes, and comprises an elliptical backing or supporting disc 245 supporting an elliptical filter disc 247. The disc 245 preferably is of perforated or expanded metal, and the filter disc 247 preferably is of open cell polyurethane foam. The disc 247 may be bonded to the supporting disc 245. The filter disc coalesces any mist size droplets that might be still entrained in the water to remove them from the water, and the coalesced mist size droplets float up into the oil collection zone. The separator is provided with a cover 212 and an oil drain valve 272 like the valve 72 and controlled by an ultrasonic control and interface sensing probe 274 like the control and probe 74. Plugged couplings 282 and 284 like the couplings 82 and 84 also are provided, as is relief valve 280 like the valve 80.

Figure 7:
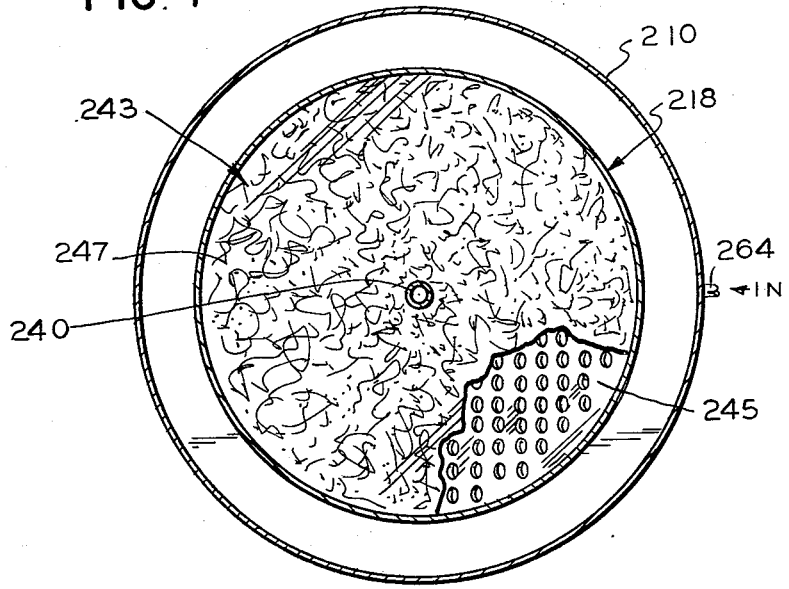
FIG. 7 is a horizontal sectional view taken along line 7—7 of FIG. 6.
Figure 6:
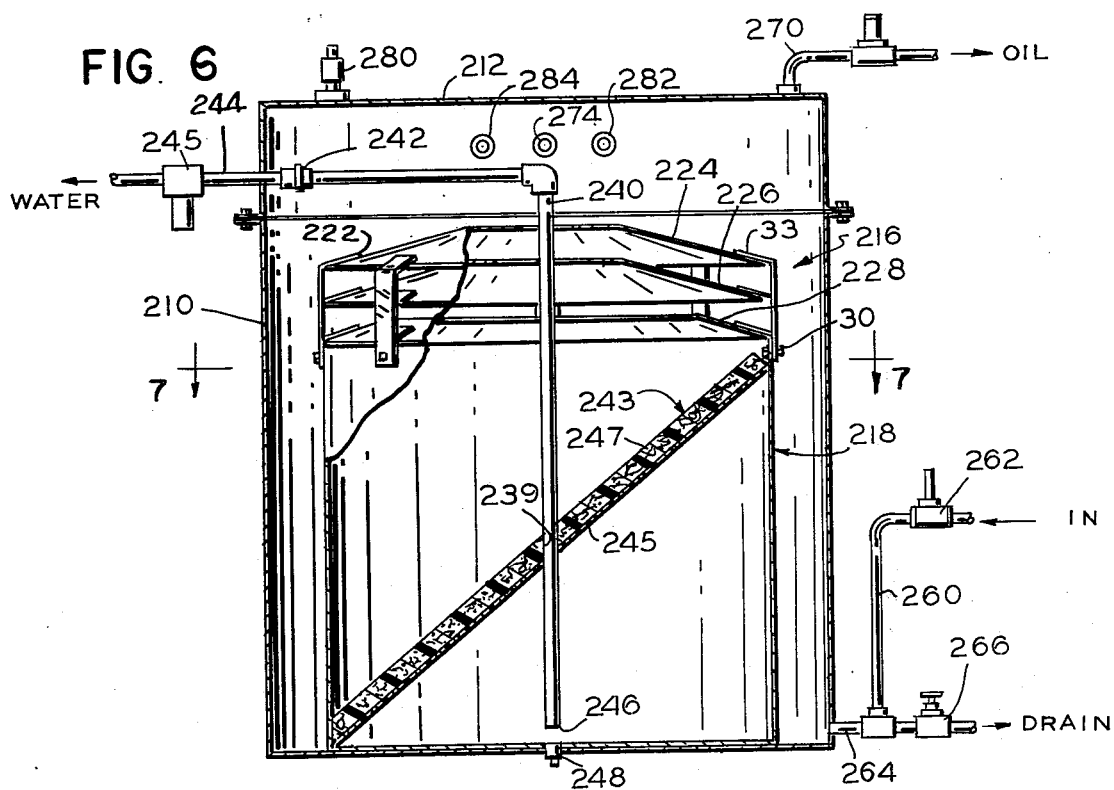
FIG. 6 is a vertical sectional view of an oil and water separator forming an alternate embodiment of the invention.

The operation of the separator of FIGS. 6 and 7 is like that of the separator of FIGS. 1-3 except that the filter 243 coalesces the very small, mist size oil droplets which then break away from the top of the filter disc 247 and float on up into the cover 212. The filter disc 247 can be easily installed and removed for cleaning and/or replacement. The pipe 240 slides easily into and out of holes 239 in the discs 245 and 247.

The above described separators are easily disassembled for servicing. The progressively increasing sizes of the openings 34, 36 and 38 and 134, 136 and 138 in the discs 24, 26, 28, 124, 126 and 128, respectively, and those in the discs 224, 226 and 228 allow easy downflows of water without any turbulence. The oil in heavy globules immediately rises to the oil trap zones in the covers 12 and 112. The mist size droplets of oil coagulate under the discs as the flow proceeds radially inwardly and the flow pushes these small accumulations to the openings 34, 36, 38, 134, 136 and 138. When the oil reaches these openings, it is in larger globules and rises into the oil trap zones. The rate of flow of water downwardly in vessels 16, 116 and 216 is relatively slow due to the large cross-sectional areas of the cups. Thus, any small mist size droplets of oil entrained with this down flowing water will move upwardly and some coagulation will take place on the discs and when enough collection occurs, the buoyancy of such larger drops will cause them to rise up into the oil trap areas. The filter 243 removes any last remnant of mist size oil particles from the water. The collected oil may be drained either manually or through use of an ultrasonic sensing system.

What is claimed is:

1. An oil and water separator,
a vertical vessel having imperforate walls and open at its top,
an outer container surrounding the vessel and forming an annular vertical passage surrounding the vertical vessel,
inlet means near the bottom of the container opening into the container but not the vessel,
a plurality of discs having central openings,
means mounting the discs at the top of the vessel in positions spaced from each other and defining vertically spaced fully annular passages,
means for flowing an oil-water mixture slowly into the inlet means, upwardly through the annular vertical passage and through the vertically spaced fully annular passages,
water outlet means for drawing water continuously from the lower portion of the vessel,
and oil retaining means for trapping and withdrawing oil flowing upwardly from the openings in the discs.

2. The oil and water separator of claim 1 wherein the openings in the discs are progressively smaller proceeding upwardly.

3. The oil and water separator of claim 1 wherein at least the lower portion of the vessel is tapered from larger to smaller in diameter proceeding downwardly.

4. The oil and water separator of claim 3 wherein the outer container has a portion above the discs forming an oil entrapment zone.

5. The oil and water separator of claim 4 including valve means for regulating flow of oil out of the outer container, and oil-water interface detecting means for opening the valve when a predetermined quantity of oil has accumulated in the upper portion of the outer container.

6. The oil and water separator of claim 1 wherein the discs are frustoconical.

7. The oil and water separator of claim 6 wherein the mounting means is detachable from the vessel.

8. The oil and water separator of claim 6 wherein the discs slope at an angle to the horizontal of about 15°.

9. The oil and water separator of claim 1 wherein the outer container includes a lower, cup-shaped container portion and an upper cap detachably secured to the container portion.

10. The oil and water separator of claim 1 including a filter positioned in the vessel between the discs and the water outlet means.

11. The oil and water separator of claim 10 wherein the water outlet means comprises a vertical pipe having its bottom near the bottom of the vessel and extending through the filter.

12. The oil and water separator of claim 11 wherein the filter slopes.

13. The oil and water separator of claim 12 wherein the filter comprises a metal screen-like supporting disc and an open cell plastic foam disc supported by the supporting disc.

14. In an oil-water separator,
container means having an imperforate inlet passage portion of a predetermined transverse cross-sectional area and also having an imperforate outlet passage portion of a transverse cross-sectional area substantially greater than that of the inlet passage portion for at least the major portion of the length of the outlet passage portion,
the container means also having an inlet to the inlet passage portion and an outlet from the outlet passage portion, both the inlet and the outlet being near one end of the container means so that an oil-water mixture supplied through the inlet flows between the inlet passage portion and the outlet passage portion toward the other end of the container means,
and oil collecting and guiding means between the inlet and outlet passage portions and positioned between said other end of the container means and the passage portions to define an upwardly positioned oil collection chamber,
the oil collecting and guiding means including a plurality of parallel upwardly sloping baffles between the inlet and outlet passage portions.

15. The oil-water separator of claim 14 wherein the outlet passage portion is a generally cylindrical imperforate inner container and the inlet passage portion is annular and concentric with the inner container and includes an outer container.

16. The oil-water separator of claim 15 wherein the oil collecting and guiding means comprises a plurality of annular baffle members spaced radially inwardly from the outer container.

* * * * *